(12) United States Patent
World et al.

(10) Patent No.: US 12,686,180 B2
(45) Date of Patent: Jul. 21, 2026

(54) NEEDLE APPARATUS

(71) Applicant: ROLLS-ROYCE plc, London (GB)

(72) Inventors: Kevin M. World, Bristol (GB); Simon Groves, Bristol (GB); Wojciech Wasinski, Bristol (GB); Neal Wright, Bristol (GB)

(73) Assignee: Rolls-Royce plc, London (GB)

( * ) Notice: Subject to any disclaimer, the term of this patent is extended or adjusted under 35 U.S.C. 154(b) by 385 days.

(21) Appl. No.: 18/476,491

(22) Filed: Sep. 28, 2023

(65) Prior Publication Data

US 2024/0123692 A1 Apr. 18, 2024

(30) Foreign Application Priority Data

Oct. 18, 2022 (GB) ...................................... 2215383

(51) Int. Cl.
B29C 65/00 (2006.01)

(52) U.S. Cl.
CPC ...... B29C 66/02242 (2013.01); B29C 66/729 (2013.01); B29C 66/845 (2013.01); *B29C 2793/0045* (2013.01)

(58) Field of Classification Search
CPC ............ B29C 66/02242; B29C 66/729; B29C 66/845; B29C 2793/0045; B29C 70/545; B29C 70/24; B26D 5/02; B26D 5/08; B26F 1/16; B26F 1/24
See application file for complete search history.

(56) References Cited

U.S. PATENT DOCUMENTS

| | | | |
|---|---|---|---|
| 3,993,523 A | 11/1976 | Hunt et al. | |
| 5,716,182 A | 2/1998 | Leu | |
| 5,971,678 A * | 10/1999 | Linderholm | B23Q 1/4828 408/150 |
| 2022/0143861 A1 | 5/2022 | Warrington | |

FOREIGN PATENT DOCUMENTS

| | | | |
|---|---|---|---|
| EP | 2581201 B1 | 12/2016 | |
| WO | WO 2009/150048 A1 * | 12/2009 | |

OTHER PUBLICATIONS

Great Britain search report dated Mar. 28, 2023, issued in GB Patent Application No. 2215383.7.
European search report dated Mar. 11, 2024, issued in EP Patent Application No. 23198789.

* cited by examiner

*Primary Examiner* — Cynthia L Schaller

(57) ABSTRACT

A needle apparatus for making a pinning hole in a composite material, the apparatus having a needle with a longitudinal axis, a collar fixed about the needle, a motor having an axis of rotation, and being fixed to the needle such that the needle can be rotated by the motor, the motor and the collar being situated within a motor housing, the motor housing having a first bush, and a second bush, wherein the collar is positioned between the first bush and second bush so as to prevent the needle from moving away from or towards the motor, but allow the needle to rotate freely around its longitudinal axis, wherein each needle apparatus further comprises a linear actuator connected to the motor such that the motor can be moved along the axis of rotation of the motor by the linear actuator.

6 Claims, 8 Drawing Sheets

NEEDLE APPARATUS

CROSS-REFERENCE TO RELATED APPLICATIONS

This specification is based upon and claims the benefit of priority from United Kingdom patent application number GB 2215383.7 filed on Oct. 18, 2022, the entire contents of which is incorporated herein by reference.

BACKGROUND

Technical Field

The present disclosure relates to a needle apparatus, a needle drive device, and a method for creating pinning holes in composite material.

Description of the Related Art

Composite materials have a large range of applications, especially in high-tech industries where their combination of strength and low mass make them particularly useful. In the aerospace industry, composite materials are considered for a number of different uses, including the manufacture of fan, turbine, and compressor blades. In such blades, the composite material is built up layers until the desired volume of material is reached. Whilst parts made using composite materials in this way are generally strong, the bonding between layers is not as strong as the bonding within a layer. To improve the strength of the bond between layers, it is known to place pins through the layers of the composite component, as for example described in European patent 2581201 B1. In order to place the pins through the layers of composite material, it is advisable to first create pinning holes in the composite material in which to place the pins. Needle drive assemblies are known for creating arrays of such pinning holes, as to create each pinning hole individually one at a time is very time consuming. In a known example of such a device, a plurality of needles are fed into the composite material, pushing aside the fibres and the resin of the composite material to form a pinning hole into which pins, or rodstock, can be inserted. The pins or rodstock is then tamped down, thus pinning the composite layers together.

The alignment between the composite material and the plurality of needles is crucial in ensuring the holes created in the composite material are of the correct depth.

The needles use to create the pinning holes will often have a shaped tip in order to aid their passage through the fibres of the composite material layers. As they are used, this shaping gets worn down, and the needles become less effective, meaning they have to be replaced. Replacing the needles of a needle drive assembly needs to be done frequently, and requires much of the assembly to be dismantled, adding to the time it takes to produce the finished composite component.

There is a need for an improved needle system and needle drive assembly which loses less time due to needle replacement, and can provide better depth control for the pinning holes it creates.

SUMMARY

According to a first aspect there is provided a needle apparatus for making a pinning hole in a composite material, the needle apparatus comprising a needle having a longitudinal axis, a collar fixed about the needle, a motor having an axis of rotation, and being fixed to the needle such that the needle can be rotated by the motor, the motor and the collar being situated within a motor housing, the motor housing having a first bush, and a second bush, wherein the collar is positioned between the first bush and second bush so as to prevent the needle from moving away from or towards the motor, but allow the needle to rotate freely around its longitudinal axis; wherein each needle apparatus further comprises a linear actuator connected to the motor such that the motor can be moved along the axis of rotation of the motor by the linear actuator.

Such a needle apparatus provides a means for accurately controlling the position of the needle, allowing for greater control over the depth of pinning hole it can be used to make in a material.

According to a second aspect, there is provided a needle drive device for making pinning holes in composite material, the needle drive device comprising a holder, a linear actuator mount, a motor mount, and a plurality of needle apparatus of the first aspect held by the linear actuator mount and the motor mount, wherein each needle apparatus further comprises a keyway which cooperates with the motor mount such that the motor housing of each of the plurality of the needle apparatus is rotationally fixed within the motor mount. The needle drive device further comprises two or more needle guides for guiding the plurality of needle apparatus, the plurality of needle apparatus and the two or more needle guides being attached to the holder, wherein the holder is actuatable such that the holder can be moved along an axis parallel to at least a portion of each needle of the plurality of needle apparatus.

Such a needle drive device allows for the precise control of an array of needles, allowing for pinning holes of different depths to be created in a material in a single operation, or for calibration purposes such as determining if a needle or needles need replacing due to excess wear on the needle tip.

Each motor housing may be removed from the motor mount individually. Such a feature allows for quicker and easier replacement of a motor.

Each linear actuator can be removed from the linear actuator mount individually. Such a feature allows for quicker and easier replacement of a linear actuator.

The combination of each linear actuator and motor housing being individually removable means that an individual needle apparatus can be removed from the needle drive device without needing to remove other or neighbouring needle apparatus.

According to a third aspect, there is provided a method of making a plurality of pinning holes of non-uniform depth simultaneously in a composite material, the method comprising providing the needle drive device of the second aspect, using said needle drive device to simultaneously create a plurality of holes of non-uniform depth in the composite material.

The method can comprise actuating the holder to place the needles such that an end of each needle is proximate to the composite material, rotating each needle using the motor the needle is fixed to, and displacing each motor along its axis of rotation using the linear actuator fixed to the motor such that each needle is pushed into the composite material by a depth controlled by the linear actuator to create a plurality of holes of non-uniform depth in the composite material.

This method allows for a plurality of pinning holes of different depths to be created in a fast and efficient manner.

The method can comprise actuating the linear actuators to adjust a position of an end of each needle closest to the composite material, rotating each needle using the motor the needle is fixed to, and actuating the holder such that each needle is pushed into the composite material by a depth controlled by the holder.

Such a method allows for the depth profile of the needles to be observed and checked against the depth profile of the composite component prior to insertion of the needles into the composite component.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying drawings. Further aspects and embodiments will be apparent to those skilled in the art.

Figure 1:
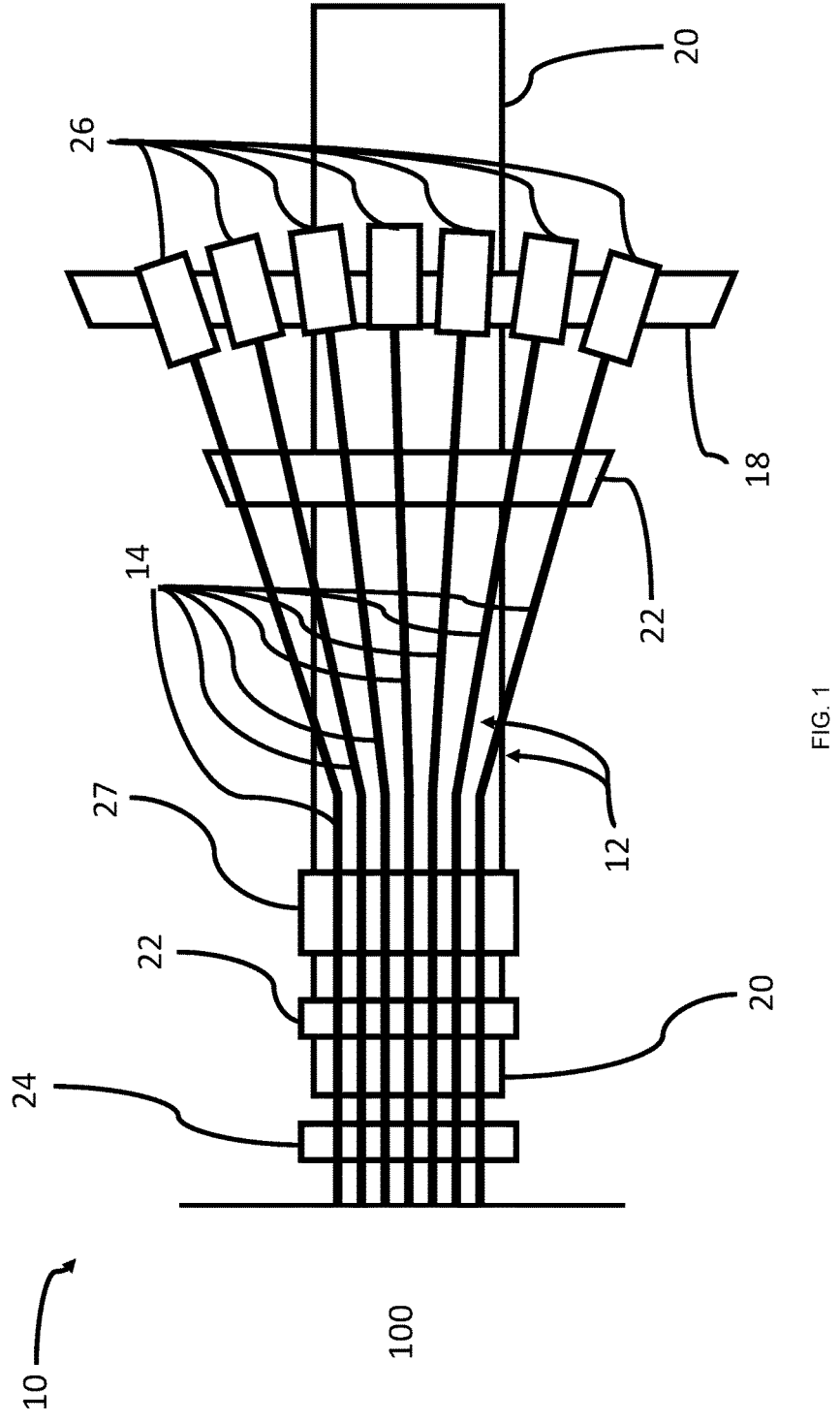
FIG. 1 is a schematic view of a known needle drive assembly.

With reference to FIG. 1, a schematic of a known needle drive assembly 10 is shown ready to make pinning holes in a piece of composite material 100, which are used for inserting pins, or rodstock, through the layers of composite so as to pin the layers of the composite together. The known needle drive assembly comprises a number of known needle systems 12—in this case seven known needle systems are shown, but the number may be fewer, such as one or two needle systems, or far greater—for example twelve, twenty-four, thirty-six, forty-eight, or sixty-four needle system, depending on the application, or the size of the composite component being worked on.

Each needle system 12 includes a needle 14 and a motor 16 (see FIG. 3) within a known motor housing 26, the motor being able to rotate the needle around longitudinal axis. The needles 14 can be made of steel, e.g. stainless steel, which, whilst being stiff enough to form a pinning hole in the composite material, is also flexible enough to be bent prior to insertion through the composite material to allow attachment to a motor. These properties are desirable where needle packing density exceeds motor packing density, and therefore requires the needles to be splayed out between the end proximate the composite component and the opposite end being driven by the motor. In the drawings, the needles 14 are shown as having at least one bend so that, whilst the tips of the needles can be densely packed in parallel alignment at the point where they contact the composite material 100

(i.e. to the left of FIG. 1), they can be further spaced apart at a point further way from the composite material (i.e. to the right of FIG. 1) in order to provide space to locate the motors 16. The known motor housings 26 are generally mounted on a known motor mount 18, which holds the known motor housings in place and attaches them to the holder 20. The known motor mount 18 is shown schematically on a straight mount, but it will be understood that the mount may in fact be curved, so as to allow each of the known motor housings to be mounted perpendicular to the surface.

In order to prevent longitudinal reaction forces generated by the composite material 100 from being exerted on the motor 16 as a needle is pressed into the composite material, each needle passes through a needle collar housing 27. Within the needle collar housing each needle has a collar 32 (see FIG. 3) fixed to it, the collar being held in place by a first bush 34 and second bush 36. The collar 32 and bushes 34, 36 prevent the needle from moving longitudinally away from or towards the motor, but allow the needle to rotate freely around its longitudinal axis. The needle collar housing is fixed to the holder 20, so as to move with the holder 20.

In order to arrange the tips of the needles 14 prior to insertion into the composite material 100, each needle 14 travels through a sleeve (not shown). The sleeves, and therefore the needles, pass through a series of needle guides 22. The needle guides 22 are generally pieces of material with an array of holes in, through which the sleeves are passed. The needles 14 can then be inserted through the sleeves. The sleeves, being supported by needle guides 22, help guide the needles between the motor 16 and the composite material 100.

Figure 2:
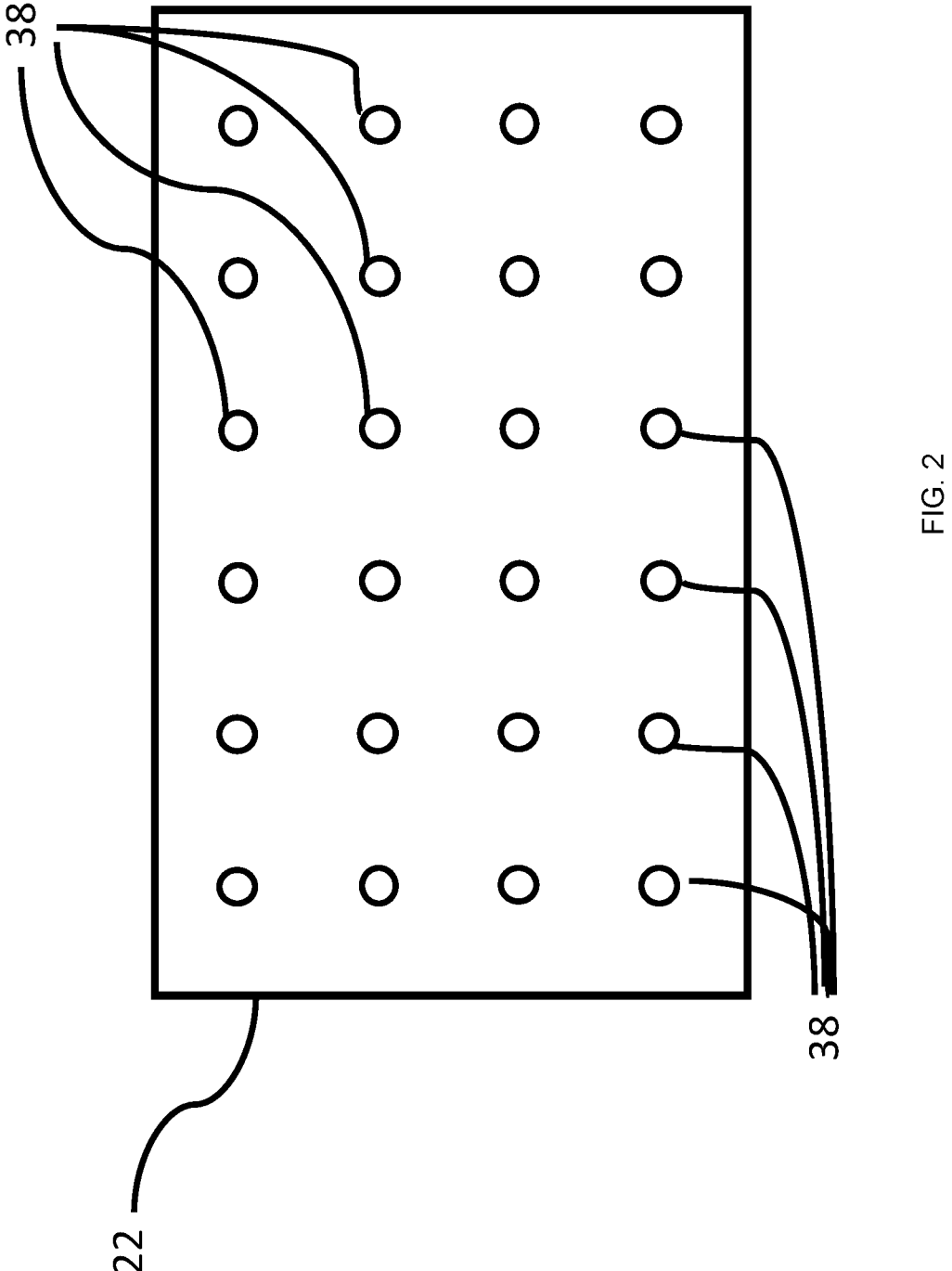
FIG. 2 is a schematic plan view of a needle guide.

It should also be noted that whilst FIG. 1 is shown with an array of needle systems in a single plane for clarity (i.e. a 1×7 array), it is possible for the needle systems to be arranged in multiple planes. For example, the needle systems may be arranged in a grid pattern, so as to create an array of needle systems, for example a 3×4 array (12 needle systems), a 4×6 array (24 needle systems), an 8×6 array (48 needle systems), or an 8×12 array (96 needle systems). An example of a needle guide 22 for a 4×6 array is shown in plan view in FIG. 2. The needle guide has an array of guidance holes 38 through which the needles 14 can pass.

As with the exemplary single plane system shown in the drawings, assemblies with multiple planes of needle systems have at least part of the needles angled towards each other as they exit the motor housings so that the needles to converge together prior to reaching a foot 24. This is because, if the needles only extended in parallel away from the foot and did not include any bend section(s), there would not be enough room for all of the motor housings required to move the needles. The skilled person will be familiar with such arrangements of needle systems.

At the end of the known needle drive assembly 10 closest to the composite material, there is the foot 24 (see FIG. 1). The foot functions much like the needle guides 22 in that the foot 24 comprises a piece of material with an array of holes in through which the sleeves pass, and then the needles 14 can be inserted. However, the array of holes in the foot matches the desired arrangement of the pinning holes to be made in the composite material, as this is the final guide the needles will pass through before they start to pierce the composite material 100.

Figure 3:
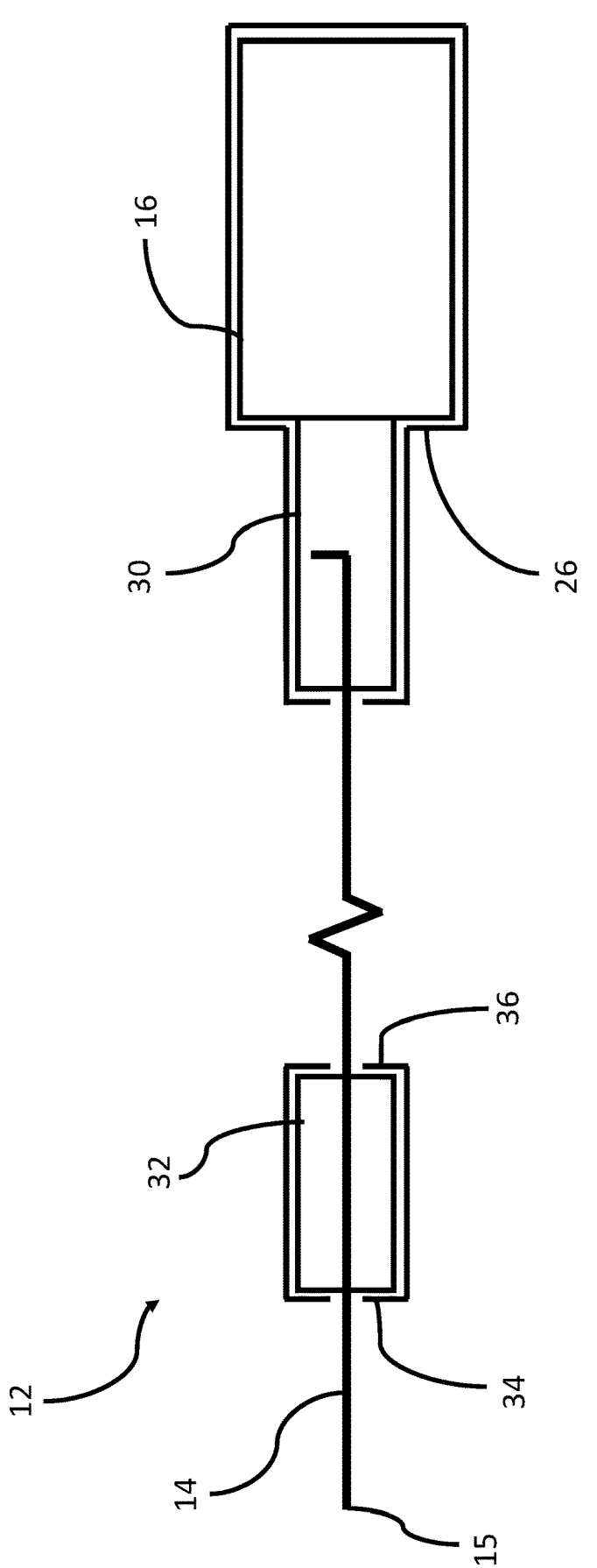
FIG. 3 is a schematic view of a known needle system.

FIG. 3 shows a sectional schematic of a known needle system 12, showing in more detail the needle 14, collar 32 and motor 16. The distance between the collar 32 and the known motor housing 26 has been shortened for clarity, as indicated by the zig-zag section. The motor 16 is situated within the known motor housing 26 which is fixed to the motor mount 18 (see FIG. 1), and therefore fixes the motor 16 in place with respect to the motor mount 18. The motor 16 rotates a drive key 30, which in turn rotates the needle 14. Further along the needle, towards the tip, is fixed a collar 32, which is positioned between a first bush 34 and a second bush 36. The collar 32 and bushes 34, 36 prevent the needle from moving longitudinally away from or towards the motor, but allow the needle to rotate freely around its longitudinal axis. This prevents longitudinal reaction force generated by the composite material 100 as the needle is pressed into it from being exerted on the motor 16, which is not optimised for having translational forces applied to it. By preventing the motor 16 from having longitudinal forces exerted upon it, the collar 32 first bush 34, and second bush 36 allow the motor to rotate the needle 14 unhindered, and extend the lifespan of the motor.

During operation, the needles 14 are positioned through the sleeves so as to emerge from the foot 24 by a controlled distance. The composite material 100 is fixed in place relative to the needle drive assembly 10, and the motors 16 are set to start rotating the needles 14. Once the needles are rotating, the holder 20 is actuated so as to move the known needle drive assembly 10 towards the composite material 100. In doing so, the now rotating needles 14 will make contact with the composite material, and be pushed into it by the actuation of the holder. Once the needles 14 have reached the required depth within the composite material 100, the actuation of the holder 20 will be stopped, and then reversed, so as to draw the known needle drive assembly 10 away from the composite component 100, and take the needles 14 out of the pinning holes they have created in the composite component 100.

As the needle is separately fixed to both the motor 16 in the known motor housing 26, and to the collar 32 in the needle collar housing 27, if a needle needs replacing, it must be disconnected from both its collar and motor before it can be removed from the known needle drive assembly. This is a time consuming process.

Figure 4:
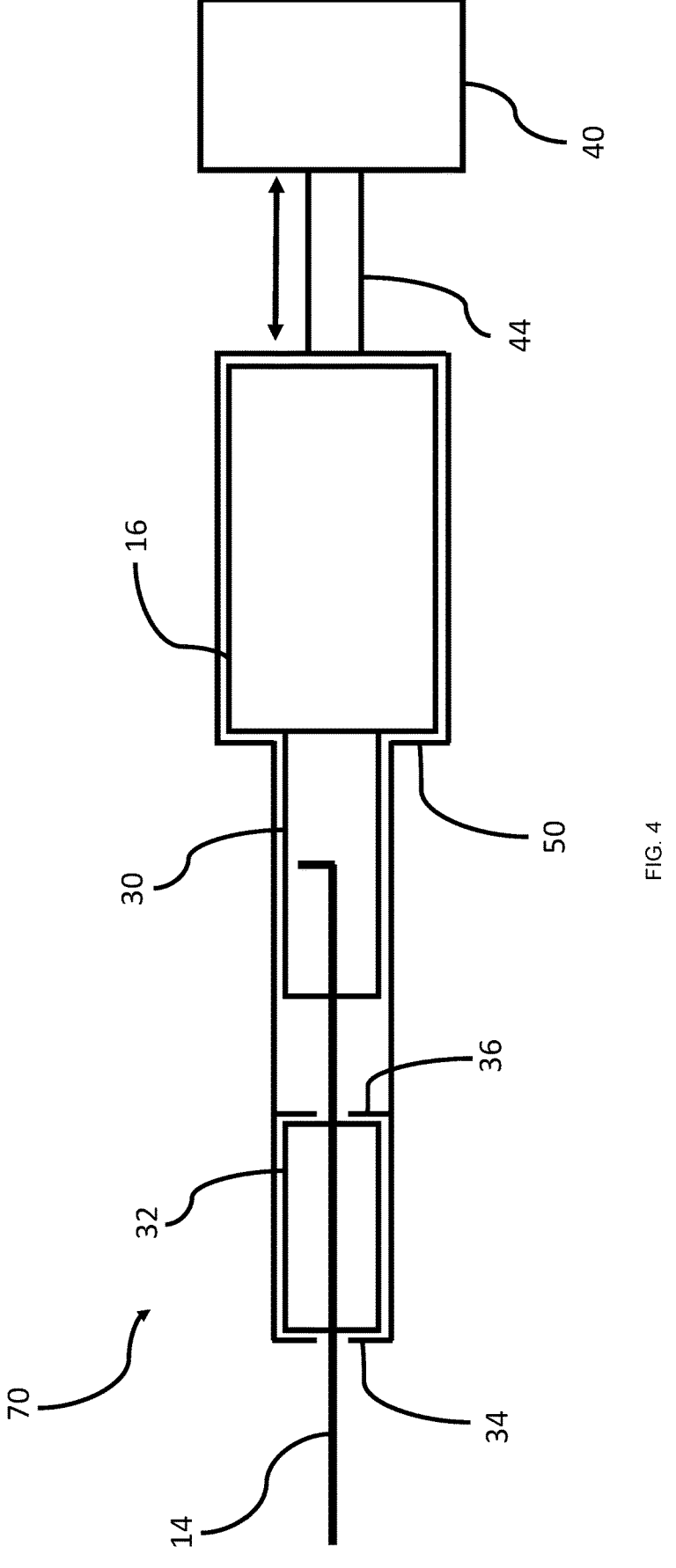
FIG. 4 is a sectional schematic view of a needle apparatus according to the present disclosure.

FIG. 4 shows a sectional schematic of a needle apparatus according to the present disclosure. The needle apparatus 70 has differences to the known needle system 12 of FIG. 2. Firstly, a linear actuator 40 has been added which in this example is connected to the motor 16 via a motor housing 50 by an actuator connector 44. The linear actuator 40 is capable of moving the motor housing 50, and therefore the motor 16, collar 32, bushes 34, 36, drive key 30 and needle 14 within the motor housing, along the rotational axis of the motor 16. Alternatively the linear actuator 40 could be directly connected to the motor 16 so as to move the motor housing 50 and other components within the motor housing via movement of the motor 16.

Secondly, the collar 32, first bush 34 and second bush 36 have been incorporated into an extension of the motor housing 50. This provides an important advantage over the known needle system 12, as it means that in order to replace a needle, only a single needle apparatus unit needs to be removed from the needle drive device 80 (see FIG. 6). This saves time when replacing needles, which is important when needles frequently need to be replaced. Having the collar incorporated into an extension of the motor housing also means that the collar moves in step with the motor and drive key, meaning no additional stress is put on the needle when the linear actuator moves the motor or motor housing.

Figure 5:
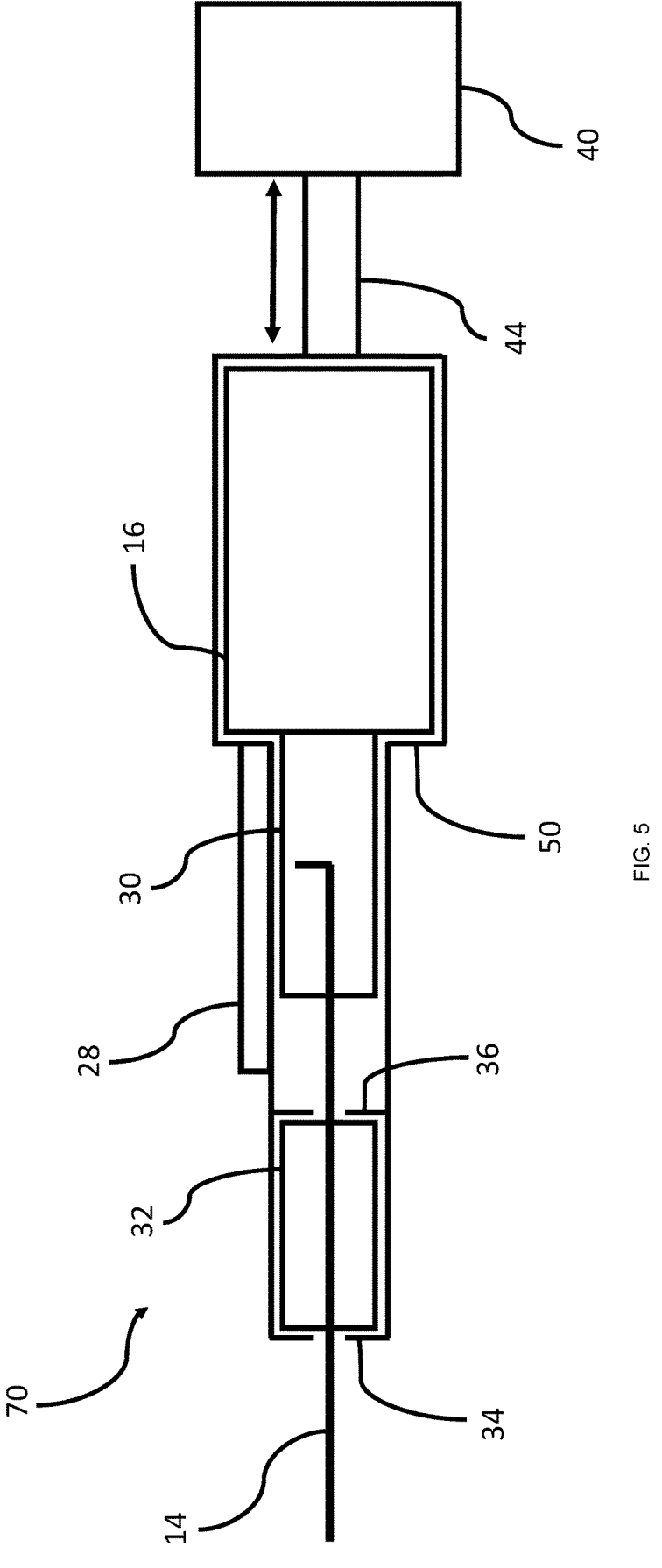
FIG. 5 is a sectional schematic view of a further needle apparatus according to the present disclosure.

FIG. 5 shows an alternative sectional schematic of a needle apparatus according to the present disclosure. In this example, a keyway 28 has been added to the needle apparatus. The keyway is advantageous when using the needle apparatus as part of a needle drive device (see FIG. 6), as it can be fitted into a corresponding groove in a motor mount 60 (for motor mount see FIG. 6. Corresponding groove not shown) so as to allow the motor housing 50 to be moved linearly through the motor mount 60 by the linear actuator 40, but preventing the motor housing 50 from rotating within the motor mount 60. The design of a keyway 28 for performing such a restraining function will be familiar to the person skilled in the art.

Figure 6:
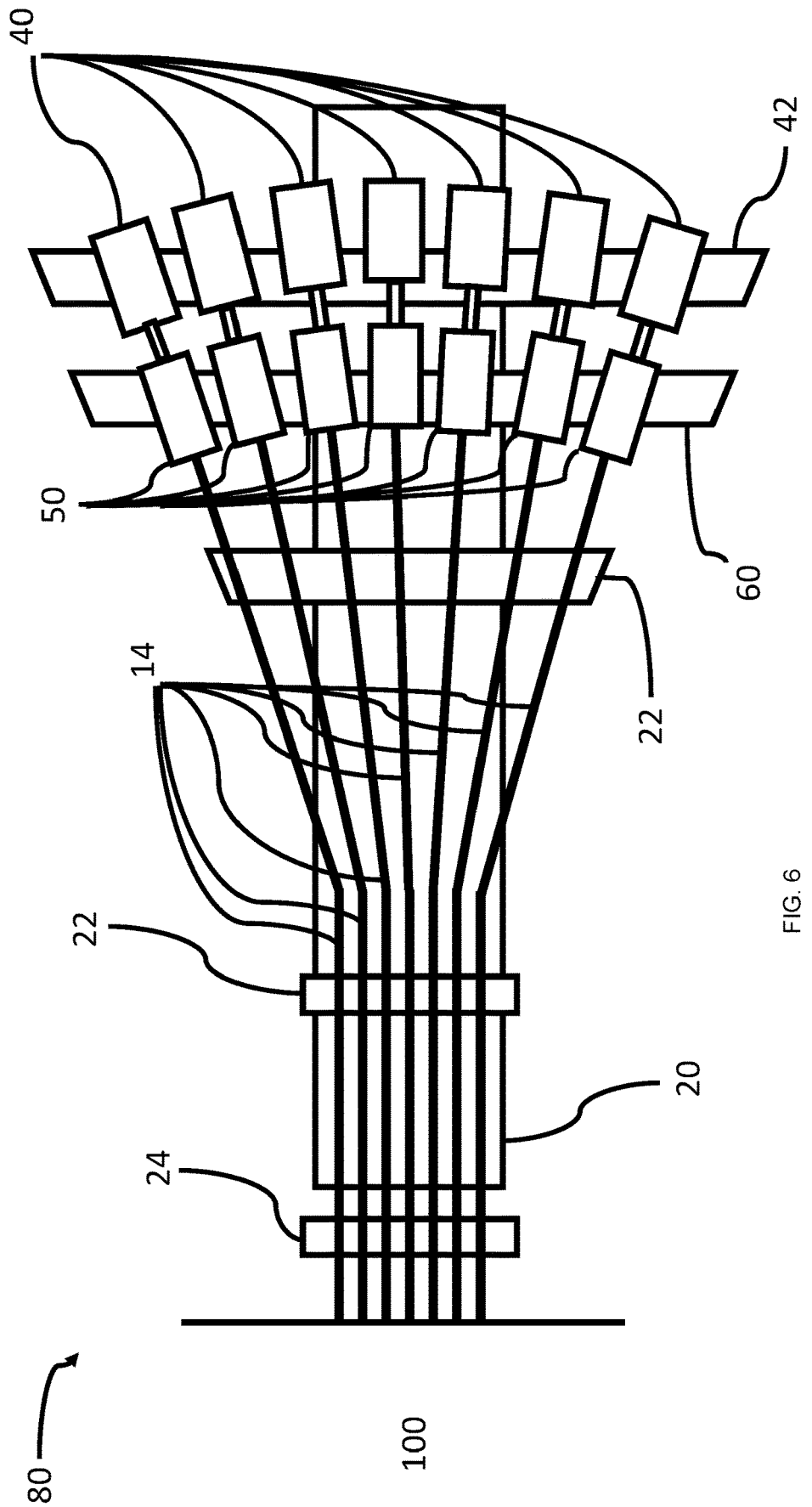
FIG. 6 is a schematic view of a needle drive device according to the present disclosure.

FIG. 6 shows a needle drive device 80 according to the present disclosure. The needle drive device includes a number of needle apparatus 70 as described with reference to FIG. 4. This new needle drive device 80 has a linear actuator mount 42, upon which are positioned the linear actuators 40 of the needle apparatus 70 such that each motor 16 or motor housing 50 of the needle apparatus 70 is connected to a linear actuator 40. The linear actuator mount 42 is connected to a holder 20 so that when the holder moves, the linear actuator mount 42, and therefore all the linear actuators 40 attached to the linear actuator mount 42, move with it. Each linear actuator 40 can be fixed to the linear actuator mount 42 using known types of fixing, such as screws, or nuts and bolts. Each linear actuator can be fixed to the linear actuator mount 42 so as to be detachable and removable from the linear actuator mount individually, without the need to detach or remove other linear actuators from the linear actuator mount. This can be achieved by having the linear actuators inserted into the linear actuator mount along the path of the needle, with the fixings accessible from the top of the linear actuator mount (i.e. to the right of the linear actuator mount, according to the orientation shown in FIG. 6).

Each motor housing 50 can also be individually inserted into and removed from the motor mount 60 without needing to detach other motor housings 50 from the motor mount 60. Therefore an entire needle apparatus 70 can be inserted into, and removed from, the needle drive device 80 without the need to remove any neighbouring linear actuators 40 or motor housings 50 or their respective mounts 42, 60. This can be achieved by, for example, configuring the apertures in the linear actuator mount 42 to allow the motor housings 50 to pass through them along the axis of the needle, so that when a linear actuator is removed, the connected motor housing of the needle apparatus 70 can be also passed through the linear actuator mount.

Figure 7:
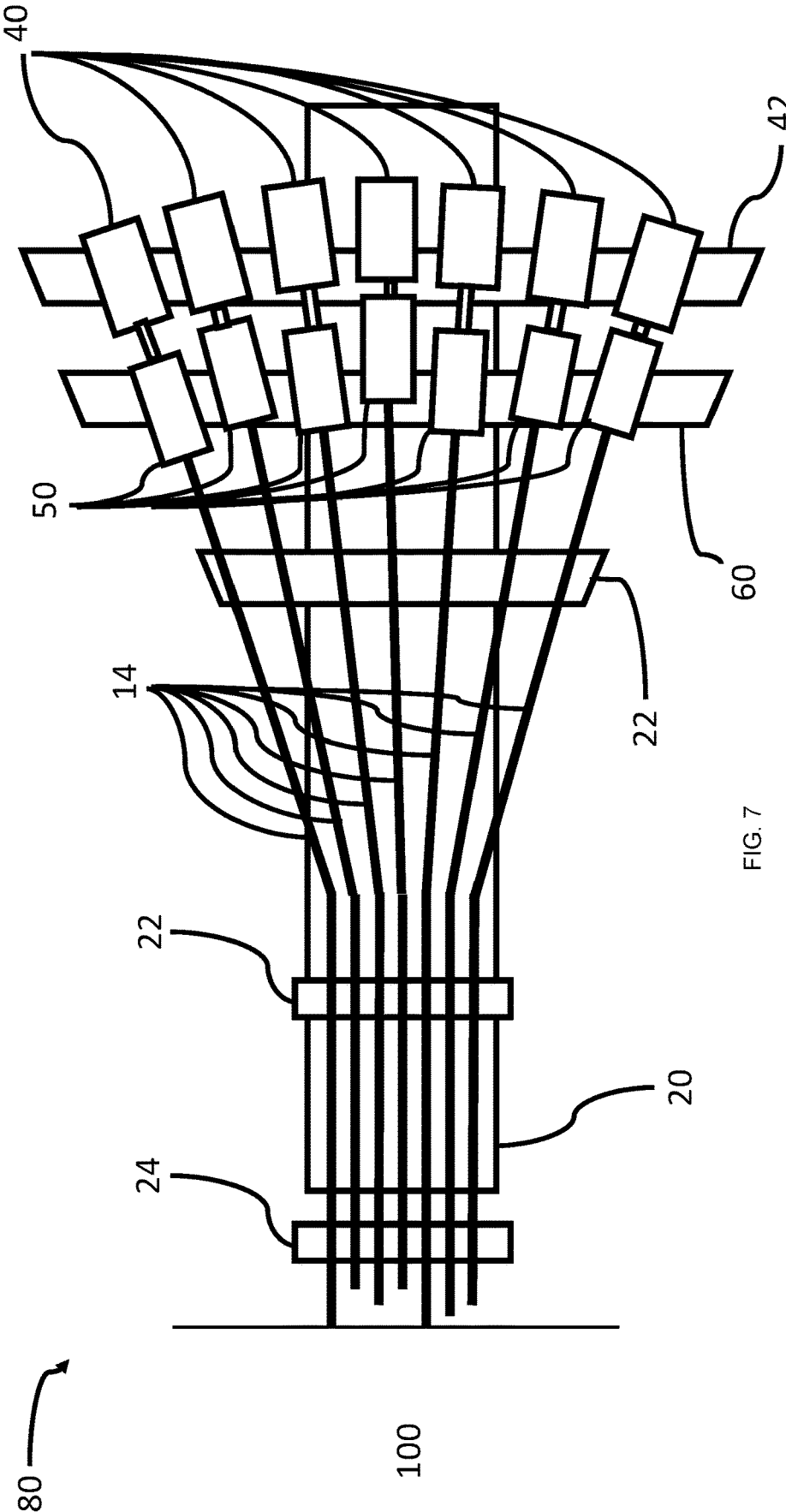
FIG. 7 is a schematic view of the needle drive device of the present disclosure in an alternative configuration.

With the addition of the linear actuators 40, the position of the needle 14 in each needle apparatus 70 can be accurately set at a different distance from the surface of the composite material 100, as shown in FIG. 7. Using the linear actuators, the motor housings 50 and therefore the needle tips have been repositioned relative to one another such that the tips of the needles are at different distances from the foot 24 of the needle drive device 80. In use, when the holder 20 is actuated towards the composite material 100, the needles 14 will penetrate the composite material 100 to different depths to create holes of different depths within the composite material. Alternatively, the needle tips can be arranged to all lie at a single distance from the foot of the needle drive device, the holder 20 can be actuated to bring the needles into position relative to the composite material 100, and then the linear actuators 40 can be used to drive the needles 14 into the composite material, with the depth each needle is driven into the composite material being controllable by the linear actuator connected to the needle. This method is useful where the composite material has a varying thickness profile across the region where the needle drive

Figure 8:
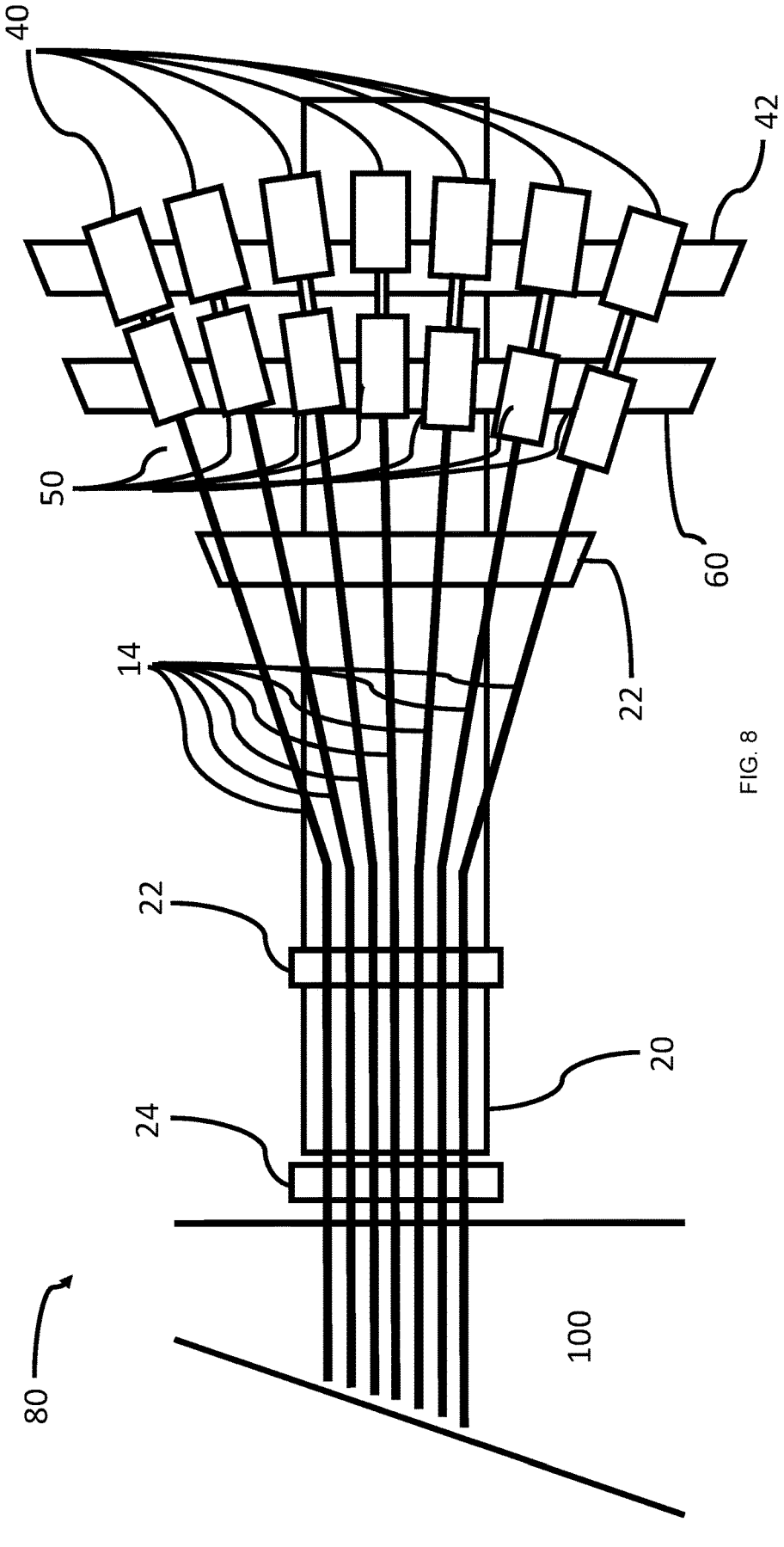
FIG. 8 is a schematic view of a needle drive device of the present disclosure in a further alternative configuration.

7 device will be creating pinning holes, an example of which is shown in FIG. 8. Again, this means the depth of each hole can be individually controlled. An alternative method to produce the same result would be to first use the linear actuators to arrange the tips of the needles according to the depths of pinning hole each needle is intended to produce. The needles can then be spun up using the motors before the holder is advanced towards the composite material. The depth of the pinning hole created by each needle will be determined by how far towards the composite material the needle tip was moved by the linear actuator prior to the movement of the holder. In this way, the depth profile of the needles can be observed and checked against the depth profile of the composite component prior to insertion of the needles into the composite component. Once the desired pinning hole depths have been achieved, the movement of the holder can be reversed and the needles removed from the composite component, ready for e.g. rodstocks to be inserted into the pinning holes.

The linear actuators 40 allow each needle 14 to be moved individually, meaning that, prior to operation, wear on the needle tips 15 can be calibrated, as the positions of the linear actuators when all the needle tips are in a common plane can be recorded, meaning it can be detected if a needle has to be moved further in order for its tip 15 to align with the tips of the other needles. By regularly performing such calibration, it can be determined which needles if any need replacing due to excess wear on the needle tip. Having both the motor housings 50 and linear actuators 40 be individually removable from the needle drive device 80, a needle apparatus 70 which has become worn can be replaced individually. This is much quicker and more efficient than having to periodically replace the whole needle array, as is the case with the prior art system, at least because with the prior art system there is no way to know how each individual needle has become worn. Therefore the whole array must be periodically replaced in order to maintain the performance of the machine, which is more time and resource consuming compared with the system of the present disclosure.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A needle drive device for making pinning holes in composite material, the needle drive device comprising:
   a plurality of needle apparatus, each needle apparatus of the plurality of needle apparatus comprising:
      a needle having a longitudinal axis;
      a collar fixed about the needle; and
      a motor having an axis of rotation, and being fixed to the needle such that the needle can be rotated by the motor, the motor and the collar being situated within a motor housing, the motor housing having a first bush, and a second bush, wherein the collar is positioned between the first bush and second bush so as to prevent the needle from moving away from or towards the motor, but allow the needle to rotate freely around its longitudinal axis;
      wherein the needle apparatus further comprises a linear actuator connected to the motor such that the motor can be moved along the axis of rotation of the motor by the linear actuator;
   a holder;
   a linear actuator mount;
   a motor mount;
   the plurality of needle apparatus held by the linear actuator mount and the motor mount, wherein each needle apparatus of the plurality of needle apparatus further comprises a keyway which cooperates with the motor mount such that the motor housing of each of the plurality of needle apparatus is rotationally fixed within the motor mount, and longitudinally moveable through the motor mount by the linear actuator; and
   two or more needle guides for guiding the plurality of needle apparatus, the plurality of needle apparatus and the two or more needle guides being attached to the holder;
   wherein each motor is individually translatable along the axis of rotation of the motor by the linear actuator to which the motor is connected, such that a distance between a motor and its connected linear actuator may be different between one or more of the plurality of needle apparatus; and
   wherein the holder is actuatable such that the holder can be moved along an axis parallel to at least a portion of each needle of the plurality of needle apparatus such that all of the plurality of needle apparatus are simultaneously moved by the holder.

2. The needle drive device of claim 1, wherein each motor housing can be removed from the motor mount individually.

3. The needle drive device of claim 1, wherein each linear actuator can be removed from the linear actuator mount individually.

4. A method of making a plurality of pinning holes of non-uniform depth simultaneously in a composite material, the method comprising the steps of:
   providing a needle drive device of claim 1; and
   using the needle drive device to simultaneously create a plurality of pinning holes of non-uniform depth in the composite material.

5. The method of claim 4, wherein using the needle drive device to simultaneously create a plurality of pinning holes of non-uniform depth in the composite material comprises:
   actuating the holder to place the needles such that an end of each needle is proximate to the composite material;
   rotating each needle using the motor the needle is fixed to; and
   displacing each motor along its axis of rotation using the linear actuator fixed to the motor such that each needle is pushed into the composite material by a depth controlled by the linear actuator to create a plurality of pinning holes of non-uniform depth in the composite material.

6. The method of claim 4, wherein using the needle drive device to simultaneously create a plurality of pinning holes of non-uniform depth in the composite material comprises:
   actuating the linear actuators to adjust a position of an end of each needle closest to the composite material;
   rotating each needle using the motor the needle is fixed to; and
   actuating the holder such that each needle is pushed into the composite material by a depth controlled by the holder.

* * * * *